United States Patent
Kim et al.

(10) Patent No.: US 10,938,327 B2
(45) Date of Patent: Mar. 2, 2021

(54) SELF-STARTING AC HARVESTER

(71) Applicant: Intel Corporation, Santa Clara, CA (US)

(72) Inventors: Suhwan Kim, Hillsboro, OR (US); Vaibhav Vaidya, Hillsboro, OR (US); Christopher Schaef, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 15/721,548

(22) Filed: Sep. 29, 2017

(65) Prior Publication Data
US 2019/0103824 A1    Apr. 4, 2019

(51) Int. Cl.
| | | |
|---|---|---|
| *H02N 2/18* | (2006.01) | |
| *H02N 2/14* | (2006.01) | |
| *H02M 3/04* | (2006.01) | |
| *H02M 3/07* | (2006.01) | |

(52) U.S. Cl.
CPC .............. *H02N 2/181* (2013.01); *H02M 3/04* (2013.01); *H02M 3/073* (2013.01); *H02N 2/145* (2013.01)

(58) Field of Classification Search
CPC ............................ H02N 2/181; H02N 2/145
USPC ......................................................... 310/318
See application file for complete search history.

(56) References Cited

U.S. PATENT DOCUMENTS

| | | | | | |
|---|---|---|---|---|---|
| 5,801,475 | A | * | 9/1998 | Kimura .................. | G01P 13/00 310/319 |
| 5,907,484 | A | * | 5/1999 | Kowshik ............... | H02M 3/073 307/110 |
| 9,362,826 | B2 | * | 6/2016 | Giuliano ................. | H02M 3/07 |
| 2003/0102775 | A1 | * | 6/2003 | Fujimura .............. | H01L 41/107 310/318 |

* cited by examiner

*Primary Examiner* — Derek J Rosenau
(74) *Attorney, Agent, or Firm* — Jordan IP Law, LLC

(57) ABSTRACT

An embodiment of a harvester apparatus comprising two or more charge pump stages may include at least a first charge pump stage to receive an alternating current source, and a second charge pump stage coupled to the first charge pump stage.

21 Claims, 5 Drawing Sheets

SELF-STARTING AC HARVESTER

TECHNICAL FIELD

Embodiments generally relate to self-starting from ambient energy sources. More particularly, embodiments relate to a self-starting alternating current (AC) harvester.

BACKGROUND

Energy harvesting may refer to a process in which energy is captured from ambient energy sources such as, for example, solar power, thermal energy, kinetic energy, etc. In some applications, energy harvesting techniques may be applied to electronic devices including, for example, small autonomous devices such as wearable electronics, wireless sensor networks, etc.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
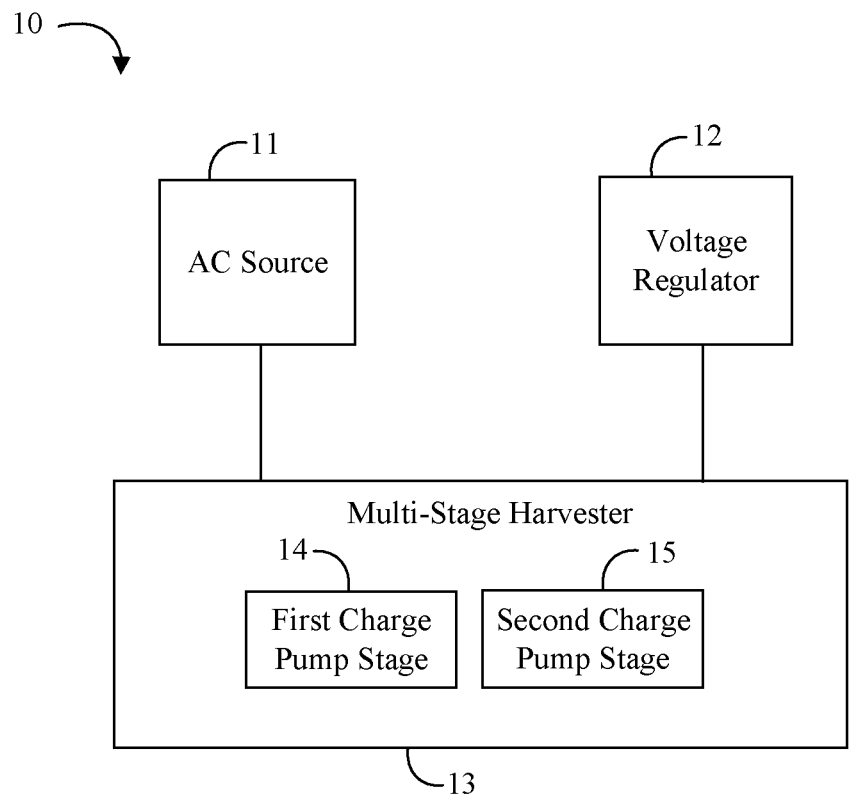
FIG. 1 is a block diagram of an example of an electronic system according to an embodiment.

Turning now to FIG. 1, an embodiment of an electronic system 10 may include an AC source 11, a voltage regulator 12, and a multi-stage harvester 13 coupled to the AC source 11 and the voltage regulator 12. The multi-stage harvester 13 may include a first charge pump stage 14 coupled to the AC source 11, and a second charge pump stage 15 coupled to the first charge pump stage 14. For example, the AC source 11 may include a piezo-electric component to convert mechanical energy to an alternating current. Other non-limiting examples for the AC source 11 include wind energy converters, other kinetic energy converters, radio frequency energy converters, inductive energy converters, etc.

As will be discussed in greater detail, in some embodiments of the system 10 the first charge pump stage 14 may include a first diode having a cathode and an anode, with the anode of the first diode coupled to ground, and a first capacitor having a first terminal and a second terminal, with the first terminal of the first capacitor coupled to the cathode of the first diode and the second terminal of the first capacitor coupled to the AC source 11. The second charge pump stage 15 may include a second diode having a cathode and an anode, with the anode of the second diode coupled to the cathode of the first diode, and a second capacitor having a first terminal and a second terminal, with the first terminal of the second capacitor coupled to the cathode of the second diode and the second terminal of the second capacitor coupled to ground. In some embodiments, the voltage regulator 12 may include a linear regulator coupled to the cathode of the second diode. In any of the embodiments described herein, the charge pump diodes (e.g., the first diode and the second diode) may each comprise a hot carrier diode.

Embodiments of each of the above AC source 11, voltage regulator 12, multi-stage harvester 13, first charge pump stage 14, second charge pump stage 15, and other system components may be implemented with any suitable hardware, including discrete components and/or integrated components. For example, integrated hardware implementations may include, for example, application specific integrated circuit (ASIC), complementary metal oxide semiconductor (CMOS) or transistor-transistor logic (TTL) technology, or any combination thereof.

Figure 2:
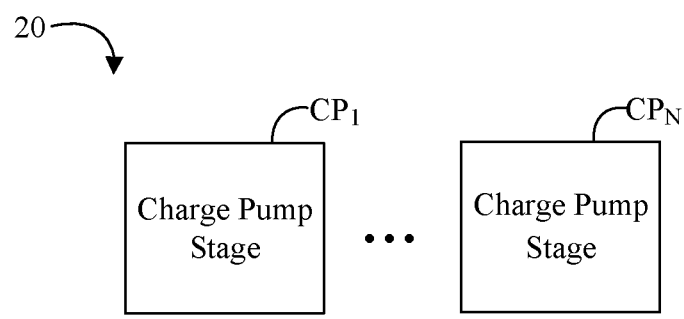
FIG. 2 is a block diagram of an example of a harvesting apparatus according to an embodiment.

Turning now to FIG. 2, an embodiment of a harvester apparatus 20 may include two or more cascaded charge pump stages $CP_1$ through $CP_N$ (where N>1). Advantageously, some embodiments may be scale-able by providing as many charge pump stages as may be necessary or beneficial for a particular application.

Figure 3:
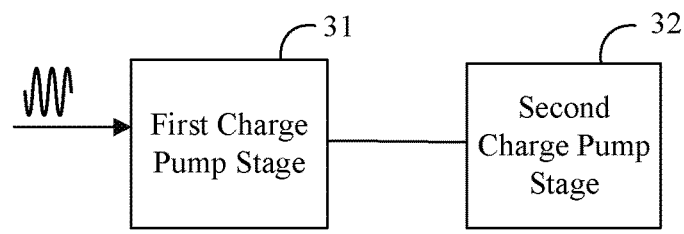
FIG. 3 is a block diagram of another example of a harvesting apparatus according to an embodiment.

Turning now to FIG. 3, an embodiment of a harvester apparatus 30 may include two or more charge pump stages including at least a first charge pump stage 31 to receive an AC source, and a second charge pump stage 32 coupled to the first charge pump stage 31. As will be discussed in greater detail, the first charge pump stage 31 may include a first diode and a first capacitor coupled in series between the AC source and ground. For example, the first diode may include a cathode and an anode, with the anode of the first diode coupled to ground, and the first capacitor may include a first terminal and a second terminal, with the first terminal of the first capacitor coupled to the cathode of the first diode and the second terminal of the first capacitor coupled to the AC source. The second charge pump stage 32 may include a second diode and a second capacitor coupled in series between ground and a junction of the first diode and the first capacitor. For example, the second diode may include a cathode and an anode, with the anode of the second diode coupled to the cathode of the first diode, and the second capacitor may include a first terminal and a second terminal, with the first terminal of the second capacitor coupled to the cathode of the second diode and the second terminal of the second capacitor coupled to ground.

Figure 4:
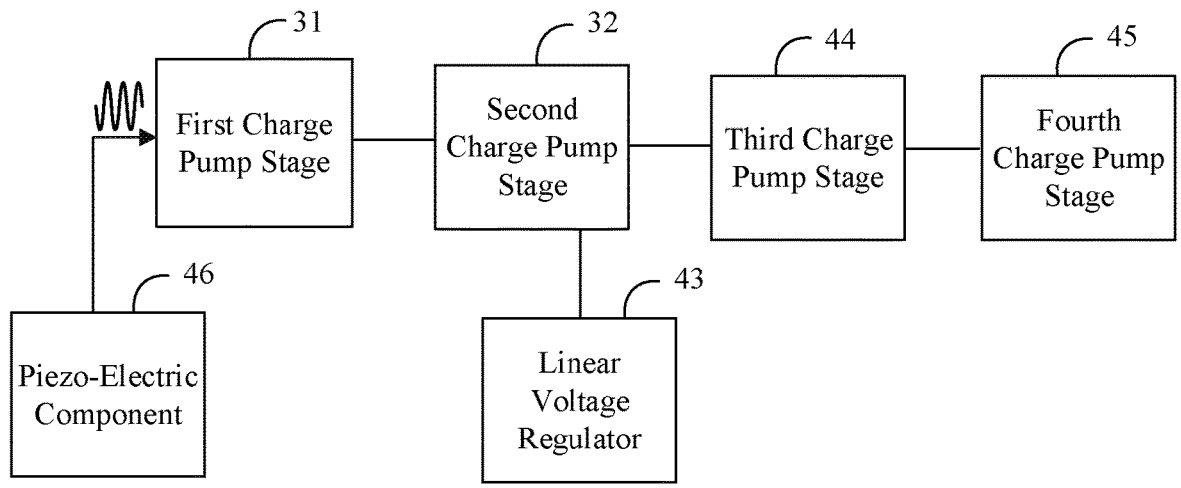
FIG. 4 is a block diagram of another example of a harvesting apparatus according to an embodiment.

Turning now to FIG. 4, an embodiment of a harvester apparatus 40 may include two or more charge pump stages, including the first charge pump stage 31 and the second charge pump stage 32. The harvester apparatus 40 may further include a linear voltage regulator 43 coupled to the second charge pump stage 32 (e.g., to a junction of the second diode and the second capacitor of the second charge pump stage 32). The harvester apparatus 40 may further include a third charge pump stage 44 coupled to the second charge pump stage 32, and a fourth charge pump stage 45 coupled to the third charge pump stage 44. As will be discussed in greater detail, the third charge pump stage 44 may include a third diode and a third capacitor coupled in series between the AC source and a junction of the second diode and the second capacitor of the second charge pump stage 32. The fourth charge pump stage 45 may include a fourth diode and a fourth capacitor coupled in series between ground and a junction of the third diode and the third capacitor of the third charge pump stage 44. For any of the harvesters described herein, a piezo-electric component 46 may convert mechanical energy to electrical energy to provide the AC source. Similarly, one or more of the charge pump stages may include a hot carrier diode such as a Schottky diode for any of the various embodiments described herein.

Embodiments of each of the above charge pump stages $CP_1$ to $CP_N$, first charge pump stage 31, second charge pump stage 32, linear voltage regulator 43, third charge pump stage 44, fourth charge pump stage 45, piezo-electric component 46, and other components of the harvester apparatuses 20, 30, 40 may be implemented in any suitable hardware, including discrete circuits, integrated circuits, or any combination thereof. For example, hardware implementations may include integrated circuit technology such as, for example, ASIC, CMOS, or TTL technology, or any combination thereof.

Figure 5:
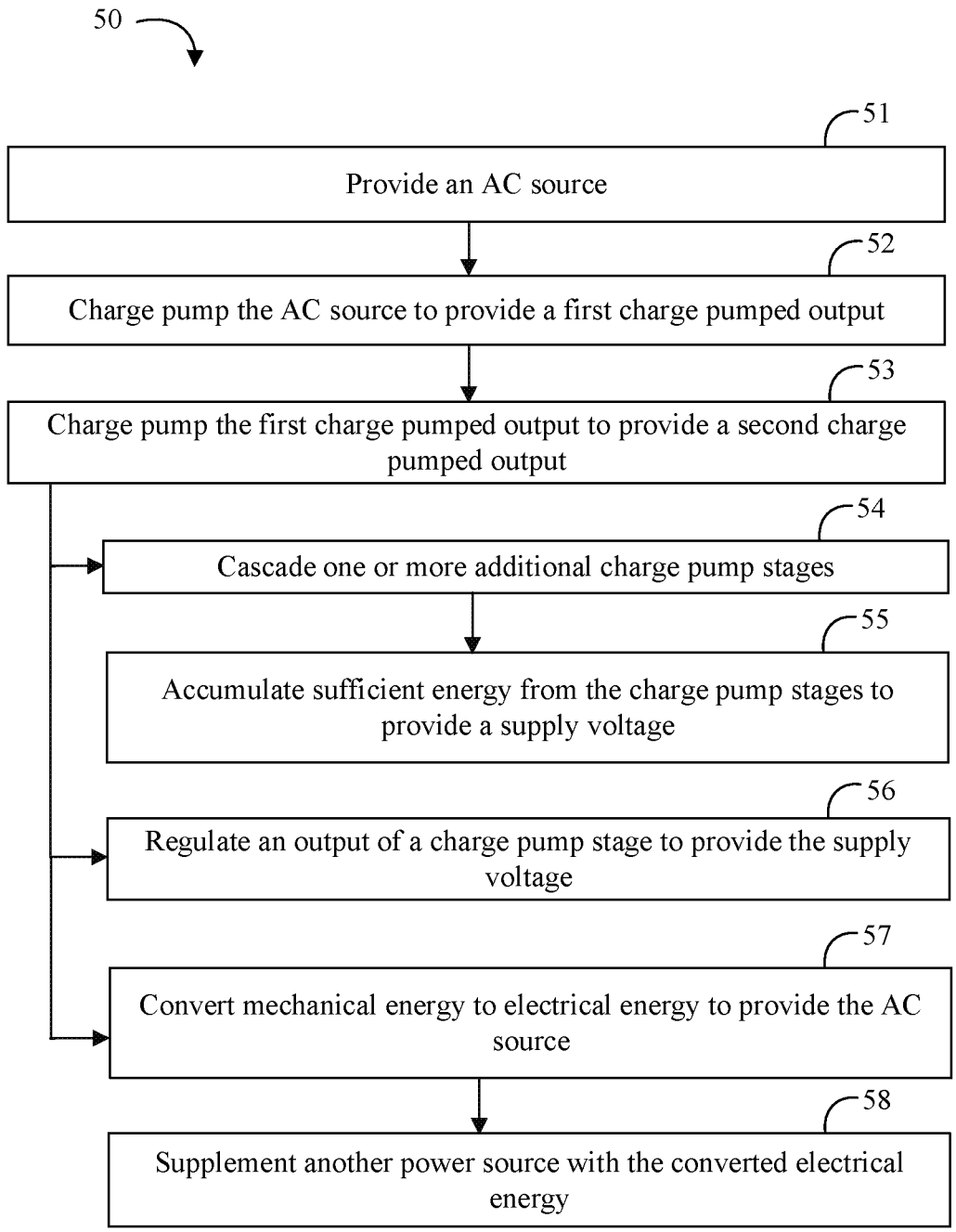
FIG. 5 is a flowchart of an example of a method of harvesting energy according to an embodiment.

Turning now to FIG. 5, an embodiment of a method 50 of harvesting energy may include providing an AC source at block 51, charge pumping the AC source to provide a first charge pumped output at block 52, and charge pumping the first charge pumped output to provide a second charge pumped output at block 53. The method 50 may further include cascading one or more additional charge pump stages at block 54, and accumulating sufficient energy from the charge pump stages to provide a supply voltage at block 55. Some embodiments may also include regulating an output of a charge pump stage to provide the supply voltage at block 56, and/or converting mechanical energy to electrical energy to provide the AC source at block 57. In some embodiments, the method 50 may involve supplementing another power source with the converted electrical energy at block 58.

Embodiments of the method 50 may be implemented in a system, apparatus, computer, device, etc., for example, such as those described herein. More particularly, hardware implementations of the method 50 may include discrete circuit technology, integrated circuit technology such as, for example, ASIC, CMOS, TTL technology, etc., or any combination thereof.

Some embodiments may advantageously provide a self-starting technique for AC harvester inputs. Some embodiments may involve an AC energy source, charge pumps, energy harvesting, net-zero energy systems, and/or self-starting. For example, some embodiments may relate to an energy-harvesting system-on-chip (SoC) device, and may be applied to any process technology. Without being limited to specific applications, self-starting from ambient energy sources may be important for net-zero energy harvesting applications because self-starting may provide a way to start operations in a dead-battery scenario. Photovoltaic sources may provide a reliable direct current (DC) source in terms of power level. In accordance with some embodiments, other kinds of sources including, for example, AC vibration energy sources, may supplement or replace photovoltaic sources when sufficient light energy is not available. Self-starting from some AC sources may be problematic because of the AC nature of the sources and the limited power level. Some embodiments may provide improved AC self-starting by driving a passive charge pump with the AC input itself to get sufficient voltage gains over a number of stages, and to supply the system's internal functions and drive power switches efficiently.

In some embodiments, a concatenated charge pump may be driven directly from an AC harvesting source ($V_{PZ}$), to generate the necessary DC power supplies and also a bootstrap supply for switch drivers. At each charge pump stage the circuit may gain additional voltage of about the amplitude of the AC input, and after accumulating over a number of stages, the output may become high enough to sufficiently generate the DC supply and/or bootstrap supplies needed.

Figure 6:
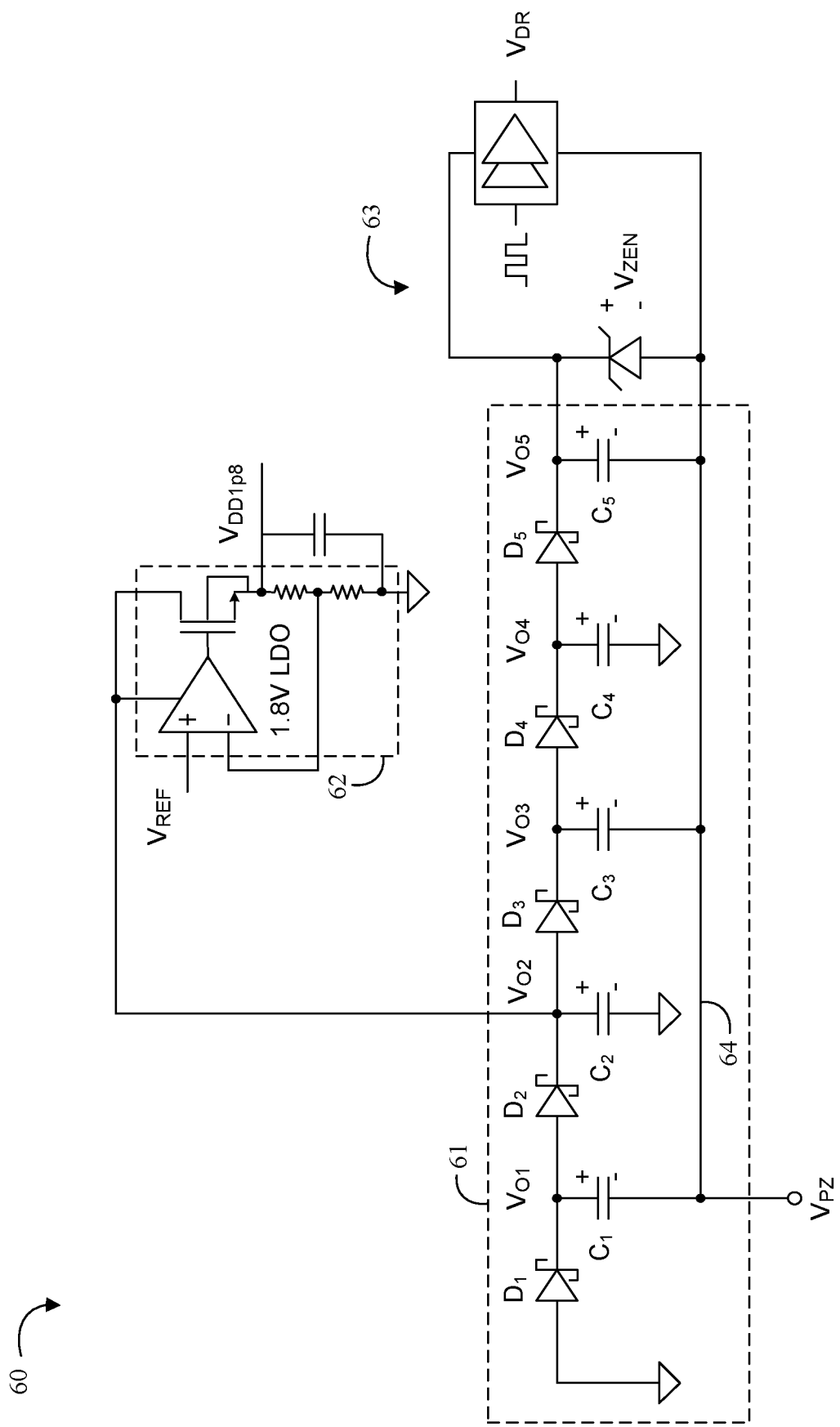
FIG. 6 is a schematic diagram of another example of a harvester apparatus according to an embodiment.

Turning now to FIG. 6, an embodiment of an electronic system 60 may include a self-starting AC harvester circuit 61, a voltage regulator circuit 62 coupled to the harvester circuit 61, and a load circuit 63 coupled to the harvester circuit 61. The self-starting AC harvester circuit 61 may include two or more cascaded charge pump circuits coupled to an AC source. For example, a common switching node 64 may be coupled to a varying voltage source $V_{PZ}$ (e.g., which may be provided from a piezo-electric converter which converts vibrations to the voltage $V_{PZ}$). The harvester circuit 61 may include a first charge pump circuit, which may include a diode D1 coupled in series with a capacitor C1 between $V_{PZ}$ and ground. An anode of the diode D1 may be coupled to ground, a cathode of the diode D1 may be coupled to a positive terminal of the capacitor C1, and a negative terminal of the capacitor C1 may be coupled to $V_{PZ}$. The harvester circuit 61 may include a second charge pump circuit, which may be coupled to the output $V_{O1}$ of the first charge pump circuit at a junction of the diode D1 and the capacitor C1. The second charge pump circuit may include a diode D2 coupled in series with a capacitor C2 between $V_{O1}$ and ground. An anode of the diode D2 may be coupled to $V_{O1}$, a cathode of the diode D2 may be coupled to a positive terminal of the capacitor C2, and a negative terminal of the capacitor C2 may be coupled to ground.

The voltage regulator circuit 62 may be coupled to an output $V_{O2}$ of the second charge pump circuit at the junction of the diode D2 and the capacitor C2. For example, the voltage regulator circuit 62 may include a linear regulator DC-DC converter. In some embodiments, a useful supply voltage may include a $V_{DD}$ of 1.8V, and the voltage regulator may include a 1.8V low-dropout (LDO) regulator to provide an output voltage $V_{DD1p8}$.

The harvester circuit 61 may include additional charge pump stages to provide additional supply voltages. For example, a third charge pump circuit may include a diode D3 coupled in series with a capacitor C3 between $V_{O2}$ and $V_{PZ}$ (e.g., on the common switching node 64). An anode of the diode D3 may be coupled to $V_{O2}$, a cathode of the diode D3 may be coupled to a positive terminal of the capacitor C3, and a negative terminal of the capacitor C3 may be coupled to $V_{PZ}$. A fourth charge pump circuit may be coupled to the output $V_{O3}$ of the third charge pump circuit at a junction of the diode D3 and the capacitor C3. The fourth charge pump circuit may include a diode D4 coupled in series with a capacitor C4 between $V_{O3}$ and ground. An anode of the diode D4 may be coupled to $V_{O3}$, a cathode of the diode D4 may be coupled to a positive terminal of the capacitor C4, and a negative terminal of the capacitor C4 may be coupled to ground. In some embodiments, the output $V_{O4}$ of the fourth charge pump circuit, at the junction of the diode D4 and the capacitor C4, may be provided to another LDO regulator to provide a 3.0V supply voltage.

The harvester circuit 61 may include a fifth and final charge pump circuit coupled to the output $V_{O4}$ of the fourth charge pump circuit. The fifth charge pump circuit may include a diode D5 coupled in series with a capacitor C5 between $V_{O4}$ and $V_{PZ}$ (e.g., on the common switching node 64). An anode of the diode D5 may be coupled to $V_{O4}$, a cathode of the diode D5 may be coupled to a positive terminal of the capacitor C5, and a negative terminal of the capacitor C5 may be coupled to $V_{PZ}$. The load circuit 63 may be coupled to an output $V_{O5}$ of the fifth charge pump circuit at the junction of the diode D5 and the capacitor C5.

The load circuit 63 is represented by a Zener diode $V_{ZEN}$ which limits the output of $V_{O5}$ to 5V and a clocked component providing an output voltage $V_{DR}$. In some embodiments, each of the diodes D1 through D5 may include a hot carrier diode, such as a Schottky diode. Advantageously, an appropriately configured Schottky diode may provide a relatively low voltage drop (e.g., about 0.1-0.2V) as compared to the voltage drop of some other diodes (e.g., about 0.6-0.7V).

Some other AC self-starting circuits may require either high voltage or high power, which may limit the usefulness of those circuits. For example, some other systems may attempt to self-start from AC inputs by rectifying the AC input with an input rectifier. Rectifying, however, requires a higher voltage amplitude than the target output plus the diode voltage (e.g., at least a two diode voltage drop before harvesting may start). Some other systems may attempt to self-start using a charge pump driven by clock to amplify the AC input. This other arrangement, however, requires a well-defined clock input, which may not be readily available during a start-up scenario from a depleted battery. Advantageously, some embodiments of a self-starting AC harvester may not need any DC voltage or any clock input to self-start, but instead may utilize its own AC input to drive a passive charge pump circuit, thereby reducing or minimizing all the dependencies in initial supply generations. For example, some embodiments may couple the AC input itself to the common switching node (e.g. acting as a clock input). In addition, in some embodiments, generating the gate-drive supply as described herein may not limit the input voltage level from which some embodiments of the circuit can harvest energy. Accordingly, some embodiments may advantageously widen the dynamic range of the AC input by a significant amount (e.g., as compared to other solutions using a fixed DC supply).

Figure 7:
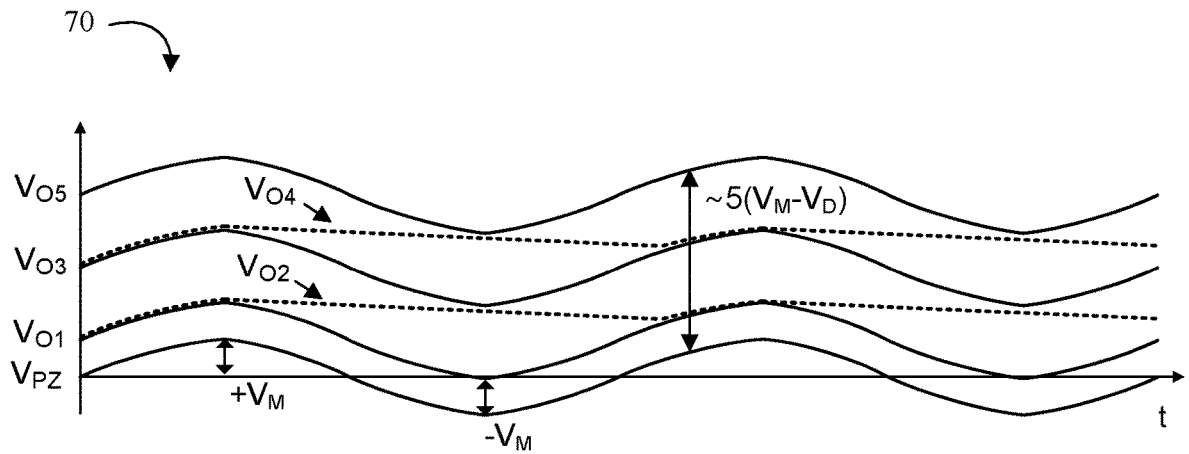
FIG. 7 is an illustrative graph of an example of voltage signals according to an embodiment.

Turning now to FIG. 7, some embodiments may be better understood with reference to a representative illustration of voltage waveforms corresponding to the voltages $V_{PZ}$ and $V_{O1}$ through $V_{O5}$ at the location indicated in FIG. 1. When the input $V_{PZ}$ swings down to a nominal minimum voltage $-V_M$, the first capacitor C1 charges up to $V_M-V_D$, where $V_M$ is the amplitude of $V_{PZ}$ and $V_D$ is the nominal forward diode voltage of a Schottky diode. When $V_{PZ}$ starts to rise, $V_{O1}$ also rises due to capacitive coupling through C1, and it reaches up to $2V_M-V_D$ at its maximum, charging C2 to $2*(V_M-V_D)$ for $V_{O2}$, and so on. For example, C3 may be charged to $3*(V_M-V_D)$ for $V_{O3}$, C4 may be charged to $4*(V_M-V_D)$ for $V_{O4}$, C5 may be charged to $5*(V_M-V_D)$ for $V_{O5}$, etc. At each stage, each output voltage $VO_X$ gains additional voltage of $(V_M-V_D)$ from the previous output $VO_{X-1}$. In the embodiment of FIG. 1, every even output $(V_{O2}, V_{O4}, \ldots)$ may have DC output voltages which may be directly fed into LDOs as needed to generate internal DC supplies. Every odd output $(V_{O1}, V_{O3}, \ldots)$ may be capacitive-coupled with $V_{PZ}$, each with different voltage offsets from $V_{PZ}$. Accordingly, an appropriate one of the voltages may be selected to be used as a gate-drive supply for an input power switch, irrespective of the input voltage level.

Figure 8:
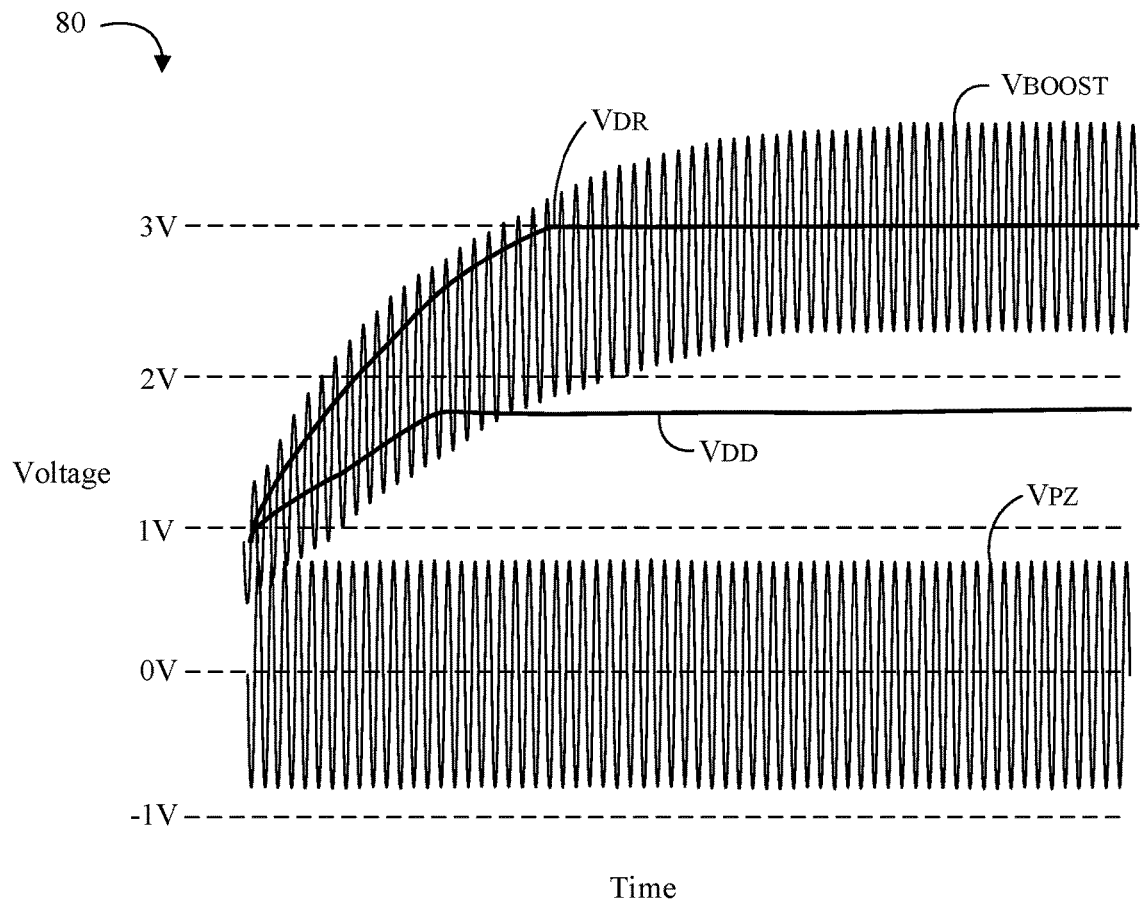
FIG. 8 is an illustrative graph of another example of voltage signals according to an embodiment.

Turning now to FIG. 8, an illustrative diagram shows representations for waveforms of generated supply voltages during start-up for an embodiment of a self-starting AC harvester circuit similar to the harvester circuit 61 (see FIG. 1). Supply voltages of $V_{DD}=1.8V$ and $V_{DR}=3.0V$ are generated purely from one AC harvesting input $V_{PZ}$, vibrating at 1 kHz with an amplitude of +/−0.8V. The VBOOST supply may drive the input switch.

Additional Notes and Examples

Example 1 may include an electronic system, comprising a voltage regulator, an alternating current source, and a multi-stage harvester coupled to the voltage regulator and the alternating current source, wherein the multi-stage harvester includes a first charge pump stage coupled to the alternating current source, and a second charge pump stage coupled to the first charge pump stage.

Example 2 may include the system of Example 1, wherein the alternating current source includes a piezo-electric component to convert mechanical energy to an alternating current.

Example 3 may include the system of Example 1, wherein the first charge pump stage comprises a first diode having a cathode and an anode, with the anode of the first diode coupled to ground, and a first capacitor having a first terminal and a second terminal, with the first terminal of the first capacitor coupled to the cathode of the first diode and the second terminal of the first capacitor coupled to the alternating current source.

Example 4 may include the system of Example 3, wherein the second charge pump stage comprises a second diode having a cathode and an anode, with the anode of the second diode coupled to the cathode of the first diode, and a second capacitor having a first terminal and a second terminal, with the first terminal of the second capacitor coupled to the cathode of the second diode and the second terminal of the second capacitor coupled to ground.

Example 5 may include the system of Example 4, wherein the voltage regulator comprises a linear regulator coupled to the cathode of the second diode.

Example 6 may include the system of any of Examples 3 to 5, wherein the first diode and the second diode each comprise a hot carrier diode.

Example 7 may include a harvester apparatus, comprising two or more charge pump stages including at least a first charge pump stage to receive an alternating current source, and a second charge pump stage coupled to the first charge pump stage.

Example 8 may include the apparatus of Example 7, wherein the first charge pump stage comprises a first diode and a first capacitor coupled in series between the alternating current source and ground.

Example 9 may include the apparatus of Example 8, wherein the first diode includes a cathode and an anode, with the anode of the first diode coupled to ground, and wherein the first capacitor includes a first terminal and a second terminal, with the first terminal of the first capacitor coupled to the cathode of the first diode and the second terminal of the first capacitor coupled to the alternating current source.

Example 10 may include the apparatus of Example 8, wherein the second charge pump stage comprises a second diode and a second capacitor coupled in series between ground and a junction of the first diode and the first capacitor.

Example 11 may include the apparatus of Example 10, wherein the second diode includes a cathode and an anode, with the anode of the second diode coupled to the cathode of the first diode, and wherein the second capacitor includes a first terminal and a second terminal, with the first terminal of the second capacitor coupled to the cathode of the second diode and the second terminal of the second capacitor coupled to ground.

Example 12 may include the apparatus of Example 10, further comprising a linear voltage regulator coupled to a junction of the second diode and the second capacitor.

Example 13 may include the apparatus of Example 10, further comprising a third charge pump stage coupled to the second charge pump stage, and a fourth charge pump stage coupled to the third charge pump stage.

Example 14 may include the apparatus of Example 13, wherein the third charge pump stage comprises a third diode and a third capacitor coupled in series between the alternating current source and a junction of the second diode and the second capacitor.

Example 15 may include the apparatus of Example 14, wherein the fourth charge pump stage comprises a fourth diode and a fourth capacitor coupled in series between ground and a junction of the third diode and the third capacitor.

Example 16 may include the apparatus of any of Examples 7 to 15, further comprising a piezo-electric component to convert mechanical energy to electrical energy to provide the alternating current source.

Example 17 may include the apparatus of any of Examples 7 to 15, wherein one or more of the charge pump stages comprise a hot carrier diode.

Example 18 may include a method of harvesting energy, comprising providing an alternating current source, charge pumping the alternating current source to provide a first charge pumped output, and charge pumping the first charge pumped output to provide a second charge pumped output.

Example 19 may include the method of Example 18, further comprising cascading one or more additional charge pump stages, and accumulating sufficient energy from the charge pump stages to provide a supply voltage.

Example 20 may include the method of Example 19, further comprising regulating an output of a charge pump stage to provide the supply voltage, Example 21 may include the method of any of Examples 18 to 20, further comprising converting mechanical energy to electrical energy to provide the alternating current source.

Example 22 may include the method of Example 21, further comprising supplementing another power source with the converted electrical energy.

Example 23 may include a harvesting apparatus, comprising means for providing an alternating current source, means for charge pumping the alternating current source to provide a first charge pumped output, and means for charge pumping the first charge pumped output to provide a second charge pumped output.

Example 24 may include the apparatus of Example 23, further comprising means for cascading one or more additional charge pump stages, and means for accumulating sufficient energy from the charge pump stages to provide a supply voltage.

Example 25 may include the apparatus of Example 24, further comprising means for regulating an output of a charge pump stage to provide the supply voltage, Example 26 may include the apparatus of any of Examples 23 to 25, further comprising means for converting mechanical energy to electrical energy to provide the alternating current source.

Example 27 may include the apparatus of Example 26, further comprising means for supplementing another power source with the converted electrical energy.

Embodiments are applicable for use with all types of semiconductor integrated circuit ("IC") chips. Examples of these IC chips include but are not limited to processors, controllers, chipset components, programmable logic arrays (PLAs), memory chips, network chips, SoCs, SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic system, comprising:
   a voltage regulator;
   an alternating current source; and
   a multi-stage harvester coupled to the voltage regulator and the alternating current source, wherein the multi-stage harvester includes:
      a first charge pump stage coupled to the alternating current source,
      a second charge pump stage coupled to the first charge pump stage, a third charge pump stage coupled to the second charge pump stage, and a fourth charge pump stage coupled to the third charge pump stage, wherein the voltage regulator comprises:

a first voltage regulator coupled to the second charge pump stage, wherein the first voltage regulator is to provide a first voltage; and a second voltage regulator coupled to the fourth charge pump stage, wherein the second voltage regulator is to provide a second voltage different from the first voltage.

2. The system of claim 1, wherein the alternating current source includes a piezo-electric component to convert mechanical energy to an alternating current.

3. The system of claim 1, wherein the first charge pump stage comprises:

a first diode having a cathode and an anode, with the anode of the first diode coupled to ground; and a first capacitor having a first terminal and a second terminal, with the first terminal of the first capacitor coupled to the cathode of the first diode and the second terminal of the first capacitor coupled to the alternating current source.

4. The system of claim 3, wherein the second charge pump stage comprises:

a second diode having a cathode and an anode, with the anode of the second diode coupled to the cathode of the first diode; and a second capacitor having a first terminal and a second terminal, with the first terminal of the second capacitor coupled to the cathode of the second diode and the second terminal of the second capacitor coupled to ground.

5. The system of claim 4, wherein:

the first voltage regulator is to be a first linear regulator coupled to the cathode of the second diode; and the second voltage regulator is to be a second liner regulator coupled to the fourth charge pump stage.

6. The system of claim 3, wherein the first diode and the second diode each comprise a hot carrier diode.

7. A harvester apparatus, comprising:

two or more charge pump stages including at least:

a first charge pump stage to receive an alternating current source;

a second charge pump stage coupled to the first charge pump stage;

a third charge pump stage coupled to the second charge pump stage; and a fourth charge pump stage coupled to the third charge pump stage; and a voltage regulator comprising:

a first voltage regulator coupled to the second charge pump stage, wherein the first voltage regulator is to provide a first voltage; and a second voltage regulator coupled to the fourth charge pump stage, wherein the second voltage regulator is to provide a second voltage different from the first voltage.

8. The apparatus of claim 7, wherein the first charge pump stage comprises a first diode and a first capacitor coupled in series between the alternating current source and ground.

9. The apparatus of claim 8, wherein the first diode includes a cathode and an anode, with the anode of the first diode coupled to ground, and wherein the first capacitor includes a first terminal and a second terminal, with the first terminal of the first capacitor coupled to the cathode of the first diode and the second terminal of the first capacitor coupled to the alternating current source.

10. The apparatus of claim 9, wherein the second charge pump stage comprises a second diode and a second capacitor coupled in series between ground and a junction of the first diode and the first capacitor.

11. The apparatus of claim 10, wherein the second diode includes a cathode and an anode, with the anode of the second diode coupled to the cathode of the first diode, and wherein the second capacitor includes a first terminal and a second terminal, with the first terminal of the second capacitor coupled to the cathode of the second diode and the second terminal of the second capacitor coupled to ground.

12. The apparatus of claim 10, wherein:

the first voltage regulator is to be a first linear voltage regulator coupled to a junction of the second diode and the second capacitor; and the second voltage regulator is to be a second linear voltage regulator coupled to the fourth charge pump stage.

13. The apparatus of claim 10, wherein the third charge pump stage comprises a third diode and a third capacitor coupled in series between the alternating current source and a junction of the second diode and the second capacitor.

14. The apparatus of claim 13, wherein the fourth charge pump stage comprises a fourth diode and a fourth capacitor coupled in series between ground and a junction of the third diode and the third capacitor.

15. The apparatus of claim 7, further comprising:

a piezo-electric component to convert mechanical energy to electrical energy to provide the alternating current source.

16. The apparatus of claim 7, wherein one or more of the charge pump stages comprise a hot carrier diode.

17. A method of harvesting energy, comprising:

providing an alternating current source;

charge pumping, with a first charge pump stage, the alternating current source to provide a first charge pumped output;

charge pumping, with a second charge pump stage, the first charge pumped output to provide a second charge pumped output;

regulating, with a first voltage regulator, the second charge pumped output to provide a first voltage;

charge pumping, with a third charge pump stage, the second charge pumped output to provide a third charge pumped output;

charge pumping, with a fourth charge pump stage, the third charge pumped output to provide a fourth charge pumped output; and regulating, with a second voltage regulator, the fourth charge pumped output to provide a second voltage, wherein the second voltage is different from the first voltage.

18. The method of claim 17, further comprising:

cascading one or more additional charge pump stages; and accumulating sufficient energy from the charge pump stages to provide a supply voltage.

19. The method of claim 18, further comprising:

regulating an output of a charge pump stage to provide the supply voltage.

20. The method of claim 17, further comprising:
converting mechanical energy to electrical energy to provide the alternating current source.
21. The method of claim 20, further comprising:
supplementing another power source with the converted electrical energy.

\* \* \* \* \*